US011967771B2

(12) United States Patent
Shu et al.

(10) Patent No.: US 11,967,771 B2
(45) Date of Patent: Apr. 23, 2024

(54) DUAL POLARIZATION ANTENNA, ROUTER, AND BASE STATION

(71) Applicant: HUAWEI TECHNOLOGIES CO., LTD., Guangdong (CN)

(72) Inventors: Yuanliang Shu, Wuhan (CN); Yunpeng Shen, Wuhan (CN); Yuzhen Zhang, Wuhan (CN); Kemeng Wang, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 86 days.

(21) Appl. No.: 17/789,964

(22) PCT Filed: Dec. 10, 2020

(86) PCT No.: PCT/CN2020/135109

§ 371 (c)(1),
(2) Date: Jun. 29, 2022

(87) PCT Pub. No.: WO2021/135884

PCT Pub. Date: Jul. 8, 2021

(65) Prior Publication Data

US 2023/0046767 A1 Feb. 16, 2023

(30) Foreign Application Priority Data

Dec. 30, 2019 (CN) ......................... 201911395896.7

(51) Int. Cl.
*H01Q 25/00* (2006.01)
*H01Q 1/50* (2006.01)
(Continued)

(52) U.S. Cl.
CPC ............. *H01Q 25/001* (2013.01); *H01Q 1/50* (2013.01); *H01Q 1/521* (2013.01); *H01Q 5/307* (2015.01); *H01Q 21/26* (2013.01)

(58) Field of Classification Search
CPC ...... H01Q 25/00; H01Q 25/001; H01Q 21/24; H01Q 21/26; H01Q 1/246; H01Q 5/48;
(Continued)

(56) References Cited

U.S. PATENT DOCUMENTS

| | | | | |
|---|---|---|---|---|
| 2007/0146216 A1 | 6/2007 | Wang et al. | | |
| 2012/0133567 A1* | 5/2012 | Harel | H01Q 9/28 | 343/798 |

(Continued)

FOREIGN PATENT DOCUMENTS

| | | |
|---|---|---|
| CN | 1591976 A | 3/2005 |
| CN | 2692856 Y | 4/2005 |

(Continued)

OTHER PUBLICATIONS

Ying Liu et al, A Novel Miniaturized Broadband Dual-Polarized Dipole Antenna for Base Station, IEEE Antennas and Wireless Propagation Letters, vol. 12, 2013, 4 pages.

(Continued)

*Primary Examiner* — Thai Pham
(74) *Attorney, Agent, or Firm* — WOMBLE BOND DICKINSON (US) LLP

(57) ABSTRACT

A dual polarization antenna that includes a conductor and two dipoles. The conductor has four radiation arms, each radiation arm forms a branch of the conductor, and two adjacent radiation arms are connected by a connection bridge. The two dipoles are arranged in a cross manner to form four sectors, one radiation arm is arranged in each sector, and the connection bridge is disposed above or below the dipole between the two radiation arms connected by the connection bridge.

20 Claims, 13 Drawing Sheets

(51) Int. Cl.

| | |
|---|---|
| ***H01Q 1/52*** | (2006.01) |
| ***H01Q 5/307*** | (2015.01) |
| ***H01Q 5/48*** | (2015.01) |
| ***H01Q 21/26*** | (2006.01) |

(58) Field of Classification Search
CPC ........ H01Q 5/371; H01Q 5/378; H01Q 5/307; H01Q 5/10; H01Q 5/321; H01Q 5/335; H01Q 1/52; H01Q 1/521
See application file for complete search history.

(56) References Cited

U.S. PATENT DOCUMENTS

| | | | | |
|---|---|---|---|---|
| 2012/0242554 | A1* | 9/2012 | Gunnels | H01Q 9/10<br>343/810 |
| 2013/0307743 | A1* | 11/2013 | Moon | H01Q 21/08<br>343/833 |
| 2014/0240188 | A1* | 8/2014 | Mamo | H01Q 21/26<br>343/798 |
| 2017/0250462 | A1* | 8/2017 | Li | H01Q 21/26 |
| 2018/0034165 | A1* | 2/2018 | Aleksandrovich | H01Q 5/392 |
| 2019/0173186 | A1* | 6/2019 | Farzaneh | H01Q 21/26 |

FOREIGN PATENT DOCUMENTS

| | | | |
|---|---|---|---|
| CN | 202268481 | U | 6/2012 |
| CN | 103094668 | A | 5/2013 |
| CN | 204029994 | U | 12/2014 |
| CN | 104900993 | A | 9/2015 |
| CN | 104953241 | A | 9/2015 |
| CN | 105051976 | A | 11/2015 |
| CN | 105552519 | A | 5/2016 |
| CN | 205944409 | U | 2/2017 |
| CN | 107317100 | A | 11/2017 |
| CN | 207852938 | U | 9/2018 |
| CN | 108649339 | A | 10/2018 |
| CN | 109103574 | A | 12/2018 |
| CN | 208862156 | U | 5/2019 |
| CN | 110622351 | A | 12/2019 |
| GB | 2517735 | A | 3/2015 |
| WO | 2014132254 | A1 | 9/2014 |
| WO | 2019052632 | A1 | 3/2019 |

OTHER PUBLICATIONS

M.—C. Tang, Z. Wu, T. Shi and R. W. Ziolkowski, "Dual-Band, Linearly Polarized, Electrically Small Huygens Dipole Antennas," in IEEE Transactions on Antennas and Propagation, vol. 67, No. 1, pp. 37-47, Jan. 2019, doi: 10.1109/TAP.2018.2874763.

* cited by examiner 1.86 GHz 2.45 GHz 5.15 GHz 5.85 GHz

DUAL POLARIZATION ANTENNA, ROUTER, AND BASE STATION

CROSS-REFERENCE TO RELATED APPLICATIONS

This application is a National Stage of International Patent Application No. PCT/CN2020/135109, filed on Dec. 10, 2020, which claims priority to Chinese Patent Application No. 201911395896.7, filed on Dec. 30, 2019, both of which are incorporated herein by reference in their entirety.

TECHNICAL FIELD

This application relates to the field of communication technologies, and in particular, to a dual polarization antenna, a router, and a base station.

BACKGROUND

Currently, due to complexity of an actual application environment of a router product and different postures and placement manners of a terminal device, the router needs to meet better throughput experience of the terminal device in different angles. Therefore, a polarized antenna becomes a reliable solution. However, frequency bands covered by the polarized antenna in the market are limited. If frequency bands such as 2.4G, 5G LB, and 5G HB Wi-Fi need to be covered, the antenna either occupies a relatively large quantity of layers or has a very complex structure, resulting in difficult processing and high costs.

The conventional technology shown in FIG. 1 discloses a dual polarization antenna. A stub that is of the dual polarization antenna and that operates in a low frequency band is directly connected to a stub that is of the dual polarization antenna and that operates in a high frequency band. The dual polarization antenna is mainly used in base station products to implement dual-band dual-polarization. However, a base station antenna usually has a complex structure. Although a dual-band function can be barely implemented, it is difficult to apply the base station antenna to a Wi-Fi frequency band and cover the entire Wi-Fi frequency band.

SUMMARY

This application provides a dual polarization antenna, a router, and a base station, to resolve a problem in the conventional technology that a dual polarization antenna cannot cover a plurality of frequency bands and has a complex structure.

According to a first aspect, this application provides a dual polarization antenna, including a conductor and two dipoles. The conductor has four radiation arms, each radiation arm forms a branch of the conductor, and two adjacent radiation arms are connected by a connection bridge. The two dipoles are arranged in a cross manner to form four sectors, one radiation arm is arranged in each sector, and the connection bridge is disposed above or below the dipole between the two radiation arms connected by the connection bridge. According to the solution provided in an embodiment, the conductor is a structure suspending above or below the two dipoles, so that the dual polarization antenna can generate four resonance points, to cover a plurality of frequency bands such as 1.8G, 2.4G, 5G LB, and 5G HB, and implement a dual polarization function in these frequency bands. In addition, the dual polarization antenna has two ports, and a degree of isolation of the two ports in a Wi-Fi frequency band reaches −20 dB, so that a requirement of a MIMO antenna is met, and a MIMO signal can be fed.

In an embodiment, the radiation arm has two half-arm elements, each of the half-arm elements has a proximal end near the connection bridge and a distal end away from the connection bridge, the half-arm element and the connection bridge are connected at the proximal end, and the two half-arm elements are connected to each other at the distal end. According to the solution provided in an embodiment, a connection between the radiation arm and two adjacent connection bridges is more flexible and free, and is not limited to one plane, and no additional connecting piece needs to be designed. This is more conducive to implement a structure in which the conductor suspends on the dipole.

In an embodiment, the half-arm element has a straight arm and a bent arm, the straight arm and the connection bridge are connected at the proximal end, the straight arm and the bent arm are connected at the distal end, and bent arms of the two half-arm elements are connected to each other at the distal end and form a radiation ring. A maximum width of the radiation ring along a circumferential direction encircling a central axis that passes through an intersection point of the two dipoles is greater than a maximum distance between the two straight arms. According to the solution provided in an embodiment, the radiation ring with an obviously large circumferential size is formed at a distal end of the radiation arm, to enhance a resonance effect between the radiation arm and the dipole.

In an embodiment, the two half-arm elements of the radiation arm are located in different planes and connected through a connection via. According to the solution provided in an embodiment, not only a suspension structure is formed between the conductor and the dipole, but also the two half-arm elements of the radiation arm are designed as a suspension structure. Serial inductivity of the via further enhances a resonance between the radiation arm and the dipole, deepens a resonance depth, optimizes impedance matching, and improves antenna performance.

In an embodiment, the connection via is separately perpendicular to the planes in which the two half-arm elements are located. According to the solution provided in an embodiment, the connection via forms a distance between the two half-arm elements, so that two planes formed by the half-arm element and a stub of the dipole are parallel to each other, to ensure that the degree of isolation between the two ports is less than −20 dB.

In an embodiment, vertical projections of the two half-arm elements of each radiation arm are axisymmetric with respect to an angular bisector of an angle formed by the two adjacent dipoles, and the four radiation arms form a cross-shaped vertical projection. According to the solution provided in an embodiment, distances between the half-arm elements of the radiation arms and the dipoles are approximately the same, so that the resonance between the conductor and the dipole is more stable.

In an embodiment, the two half-arm elements connected by the connection bridge are located in a same plane, two adjacent connection bridges are located in different planes, and two connection bridges that are symmetric with respect to the dipole are located in a same plane. According to the solution provided in an embodiment, the conductor and the dipoles jointly form two resonance planes, and each resonance plane has branches of the two dipoles, two connection bridges that are symmetric with respect to one of the dipoles, and the half-arm elements that are of two adjacent radiation arms and connected to the two connection bridges, to accurately form four resonance points and cover all Wi-Fi frequency bands.

In an embodiment, the radiation arm further has a hollow portion, and the hollow portion is formed by the two half-arm elements of the radiation arm through enclosing. According to the solution provided in an embodiment, the hollow portion on each radiation arm enables the conductor to implement unbalanced transformation.

In an embodiment, a feeding space is enclosed by the four connection bridges, and the four hollow portions are connected to each other through the feeding space. According to the solution provided in an embodiment, a projection of the conductor is in a shape of a cross slot.

In an embodiment, each of the dipoles includes two dipole elements and a coupling arm located between the two dipole elements. The coupling arm is mechanically connected to one of the dipole elements through a via, and electrically coupled to the other dipole element through a feed point, and the feed point and the via are located on two opposite sides of a central axis that passes through an intersection point of the two dipoles. According to the solution provided in an embodiment, serial inductivity of the via is introduced to optimize impedance matching, deepen a resonance depth, and improve antenna performance.

In an embodiment, a feeding space is enclosed by the four connection bridges, and the via and the feed point are located in the feeding space. According to the solution provided in an embodiment, currents of two stubs of the dipole are blocked in the feeding space, and the current of one stub of the dipole is obviously stronger than the current of the other stub.

In an embodiment, the feed point is disposed at an end that is of the dipole element and that is located in the feeding space, or disposed at an end that is of the coupling arm and that is away from the via. According to the solution provided in an embodiment, in the feeding space, the current of the dipole undergoes upper- and lower-layer electric coupling, to deepen the resonance depth.

In an embodiment, the coupling arm and the dipole element of each dipole are located in different planes, and the coupling arms of the two dipoles are located in different planes. According to the solution provided in an embodiment, in the feeding space, the current flowing through the dipole undergoes upper- and lower-layer coupling twice, to further deepen the resonance depth.

In an embodiment, polarization planes of the two dipoles extend orthogonally to each other. According to the solution provided in an embodiment, polarization orthogonality of the two dipoles can ensure that the degree of isolation between the two ports meets a requirement of intermodulation on a degree of isolation between antennas, and the degree of isolation is less than −20 dB while all Wi-Fi frequency bands are covered.

In an embodiment, an included angle between the radiation arm and each of the two adjacent dipoles is 45°. According to the solution provided in an embodiment, resonance distances between the radiation arms of the conductor and the dipole elements of the dipole are the same.

In an embodiment, projections of the four radiation arms in a vertical space parallel to the central axis that passes through the intersection point of the two dipoles form a centrosymmetric cross shape with respect to the central axis. According to the solution provided in an embodiment, the conductor forms a suspension cross structure with respect to the dipoles.

In an embodiment, an included angle between the connection bridge and each of the two adjacent radiation arms is 135°. According to the solution provided in an embodiment, the feeding space is square.

According to a second aspect, this application provides a router, including the dual polarization antenna according to the first aspect.

According to a third aspect, this application provides a base station, including the dual polarization antenna according to the first aspect.

It can be learned that in the foregoing aspects, the pair of orthogonal dipoles and the suspension cross-shaped conductor are combined, and four resonances are formed through properly upper- and lower-layer arrangement and by adding the via in the feeding space, to cover the Wi-Fi frequency band. Compared with the conventional technology, when the degree of isolation between the ports is less than −20 dB, the antenna has better impedance matching, a deeper resonance depth, and better radiation performance, is applicable to the router or the base station, and has a better signal receiving and sending effect.

REFERENCE NUMERALS

1—Conductor;

11—radiation arm;

- 111—half-arm element;
  - 1111—straight arm;
  - 1112—bent arm;
- 12—connection bridge;
- 13—connection via;
- 14—hollow portion;
- 15—feeding space;
- 2—dipole;
- 21—dipole element;
- 22—coupling arm;
- 23—via;
- 24—feed point;
- 3—sector;
- 31—angular bisector;
- 4—upper resonant plane;
- 5—lower resonant plane.

DESCRIPTION OF EMBODIMENTS

To better understand the technical solutions of this application, the following describes embodiments of this application in detail with reference to the accompanying drawings.

It should be clear that the described embodiments are merely some rather than all of embodiments of this application. All other embodiments obtained by persons of ordinary skill in the art based on embodiments of this application without creative efforts shall fall within the protection scope of this application.

Terms used in embodiments of this application are merely for the purpose of describing embodiments, but are not intended to limit this application. Terms "a", "the", and "this" of singular forms used in embodiments and the appended claims of this application are also intended to include plural forms, unless otherwise specified in the context clearly.

It should be understood that the term "and/or" used in this specification describes only an association relationship between associated objects and represents that three relationships may exist. For example, A and/or B may represent the following three cases: Only A exists, both A and B exist, and only B exists. In addition, the character "I" in this specification generally indicates an "or" relationship between the associated objects.

It should be noted that orientation words such as "above", "below", "left", and "right" described in embodiments of this application are described from perspectives shown in the accompanying drawings, and should not be construed as a limitation on embodiments of this application. Moreover, in the context, it also should be understood that, when it is mentioned that one element is connected "above" or "below" another element, the element can be directly connected "above" or "below" the another element, or may be indirectly connected "above" or "below" the another element through an intermediate element.

Figure 1:
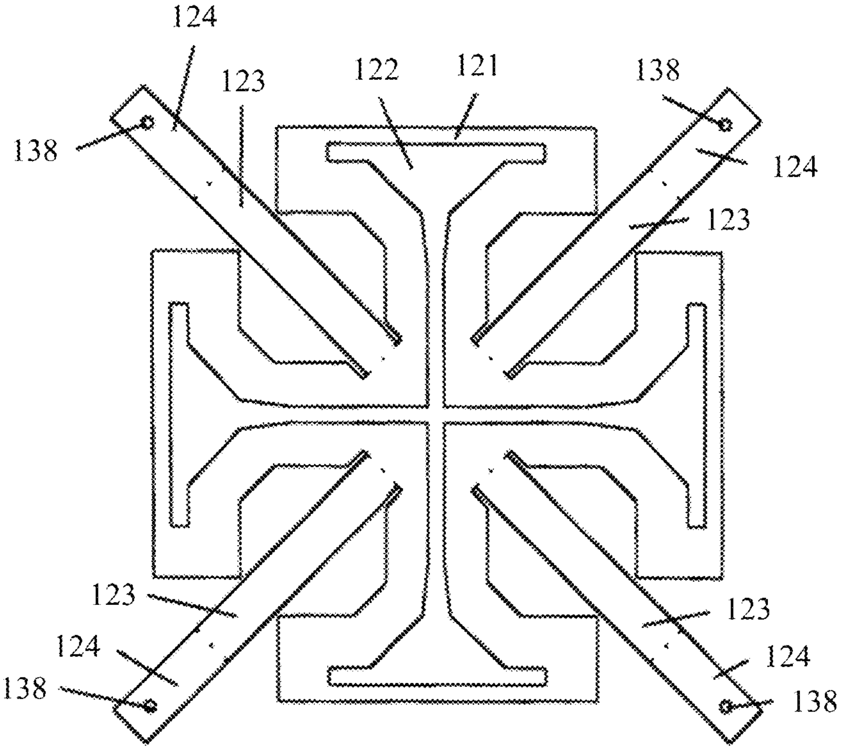
FIG. 1 (Prior art)
FIG. 1 is a schematic diagram of a plane structure of a dual polarization antenna used in the conventional technology.
Figure 2:
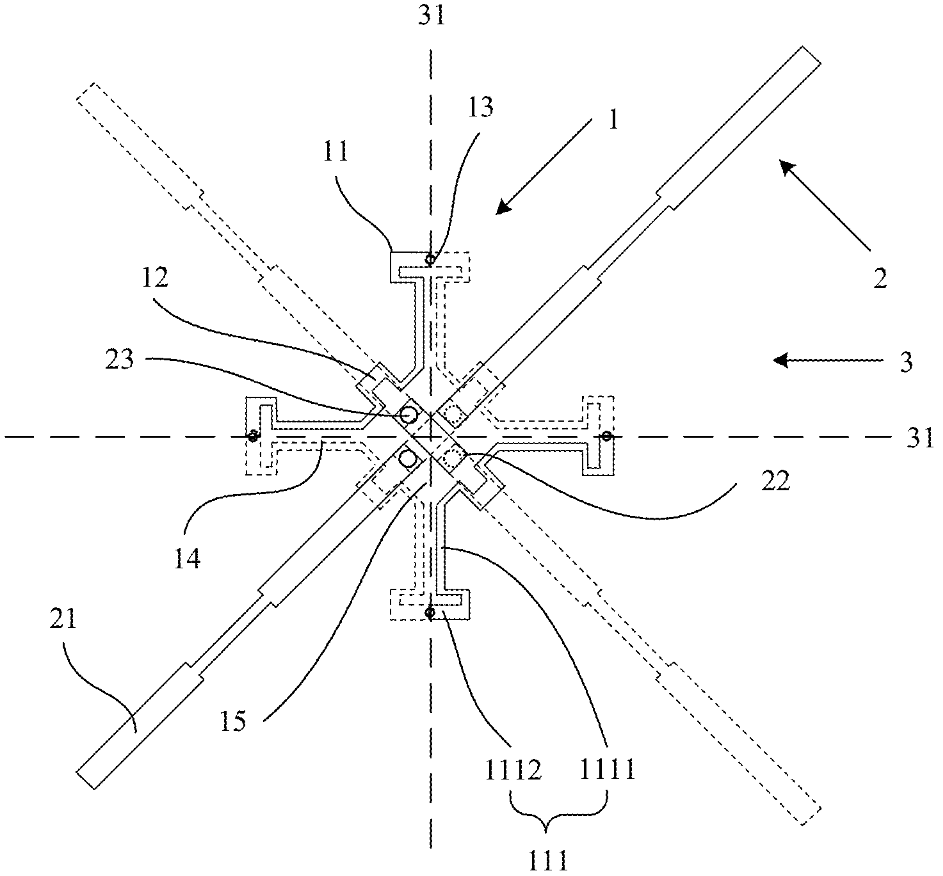
FIG. 2 is a plan view of a dual polarization antenna according to an embodiment of this application.
Figure 3:
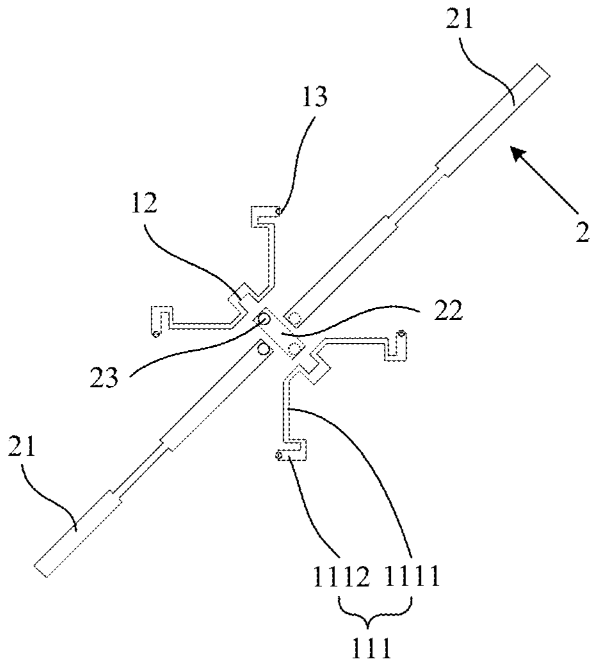
FIG. 3 is a schematic diagram of an upper-layer structure of a dual polarization antenna according to an embodiment of this application.
Figure 4:
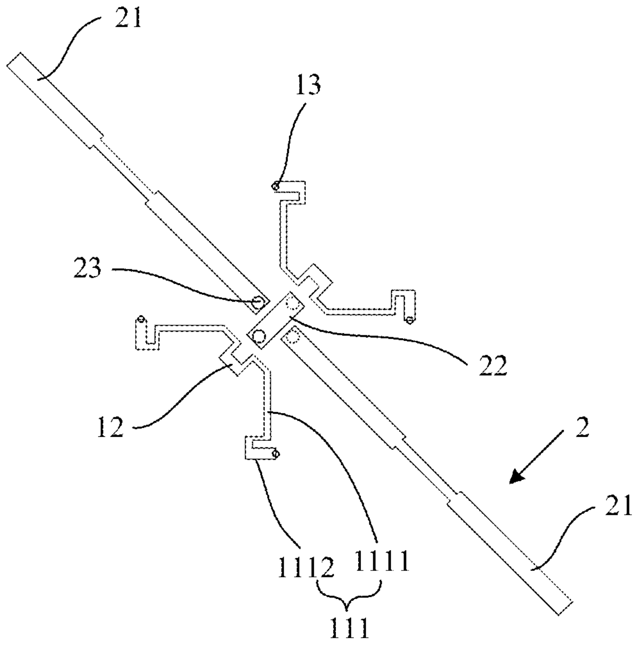
FIG. 4 is a schematic diagram of a lower-layer structure of a dual polarization antenna according to an embodiment of this application.
Figure 5:
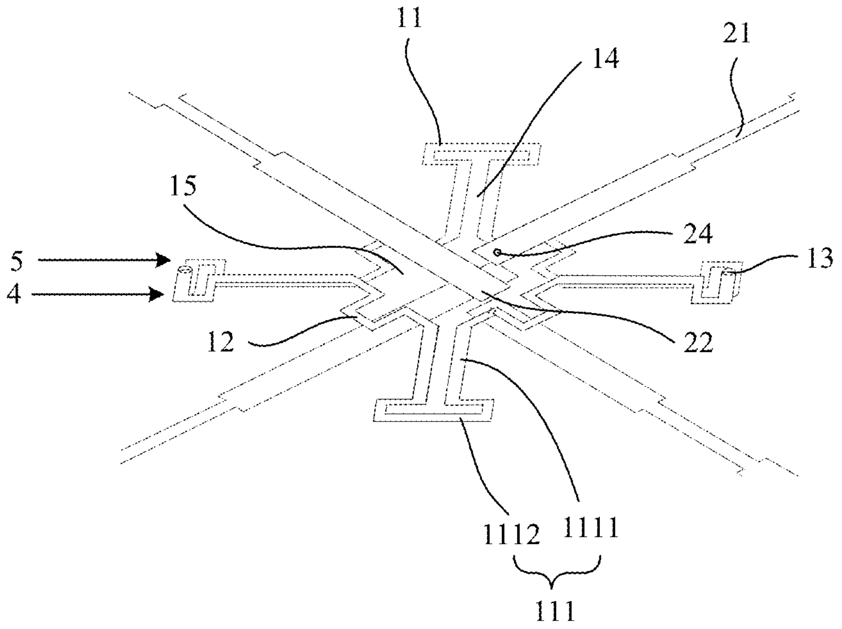
FIG. 5 is a schematic diagram of a partially enlarged three-dimensional structure of a dual polarization antenna in which no via is introduced according to an embodiment of this application.
Figure 6:
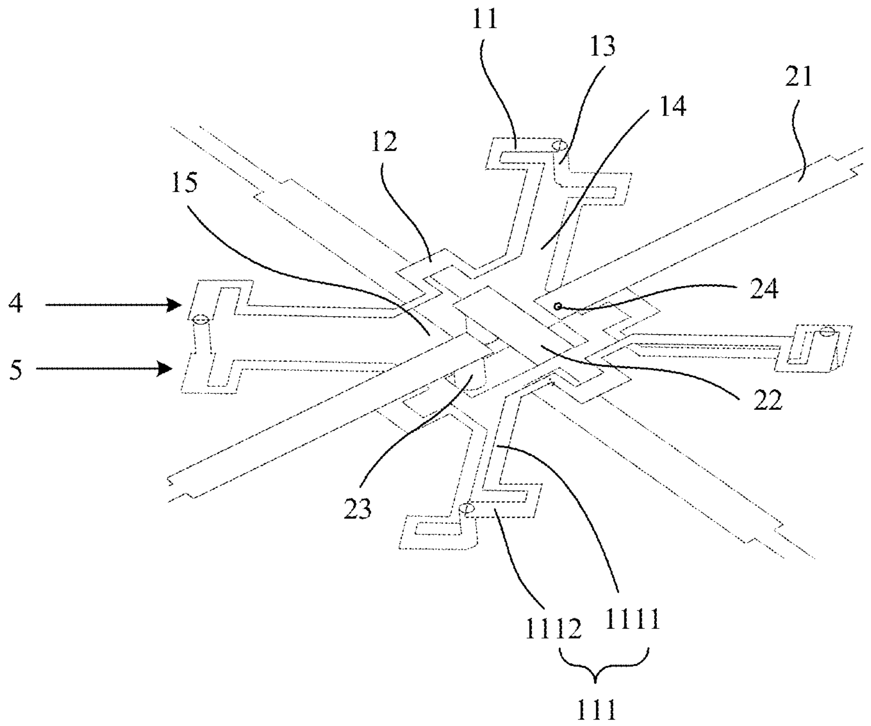
FIG. 6 is a schematic diagram of a partially enlarged three-dimensional structure of a dual polarization antenna in which no via is introduced according to an embodiment of this application.
Figure 7:
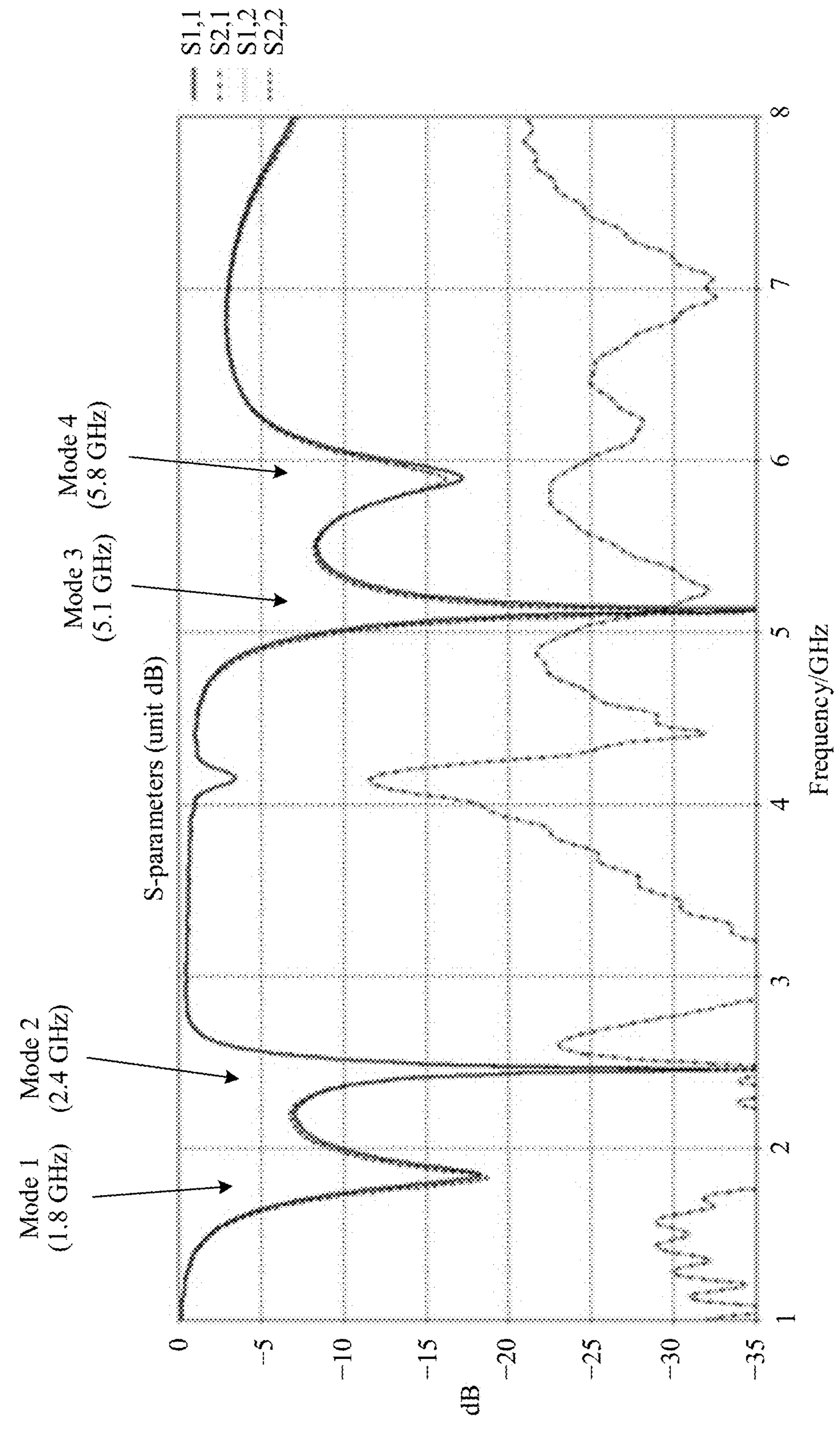
FIG. 7 is a simulation diagram of a signal resonance of a dual polarization antenna according to an embodiment of this application.
Figure 8:
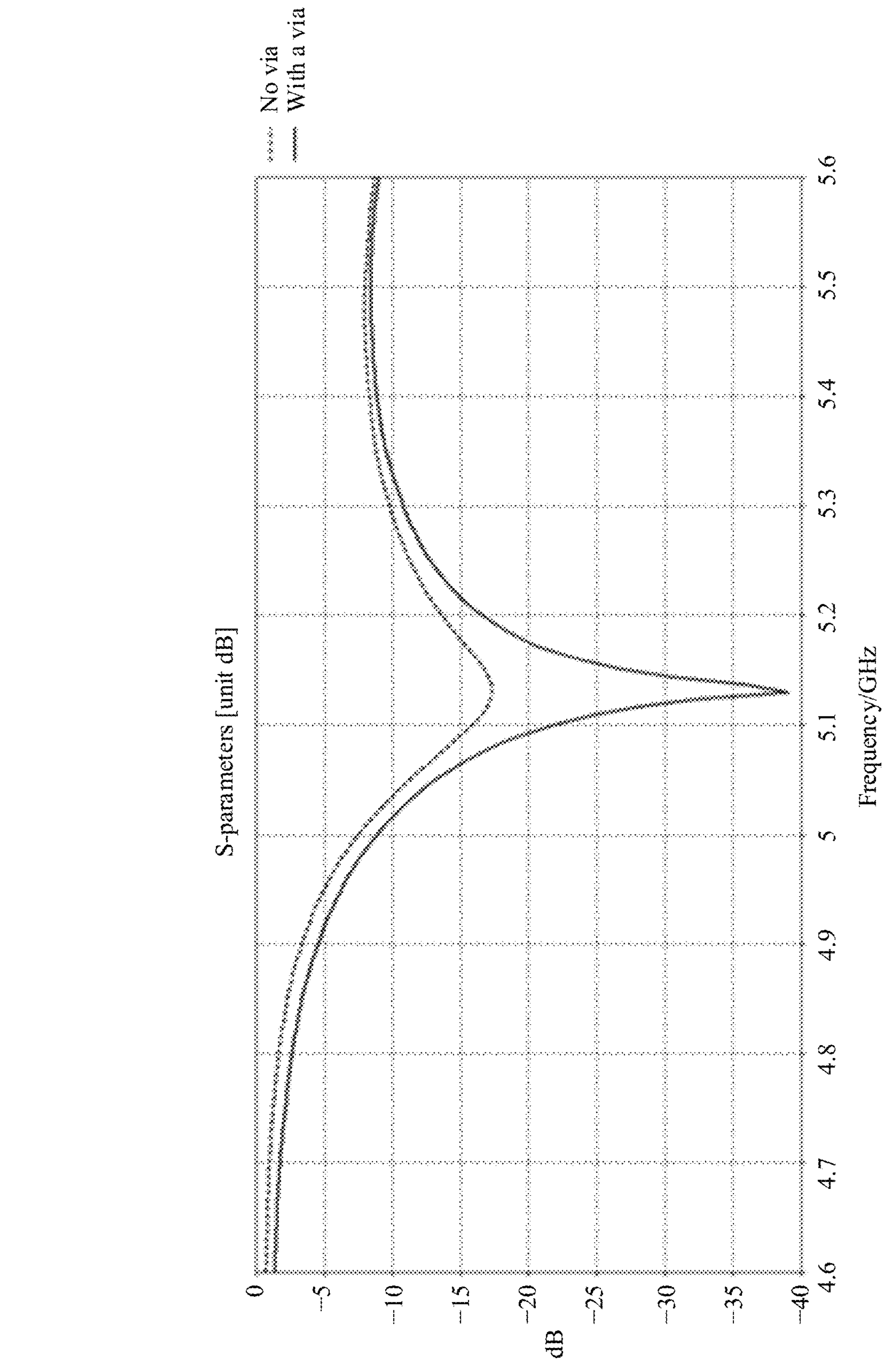
FIG. 8 is a simulation comparison diagram of a resonance generated when no via is introduced in a dual polarization antenna and a resonance generated when a via is introduced in a dual polarization antenna are compared according to an embodiment of this application.
Figure 9:
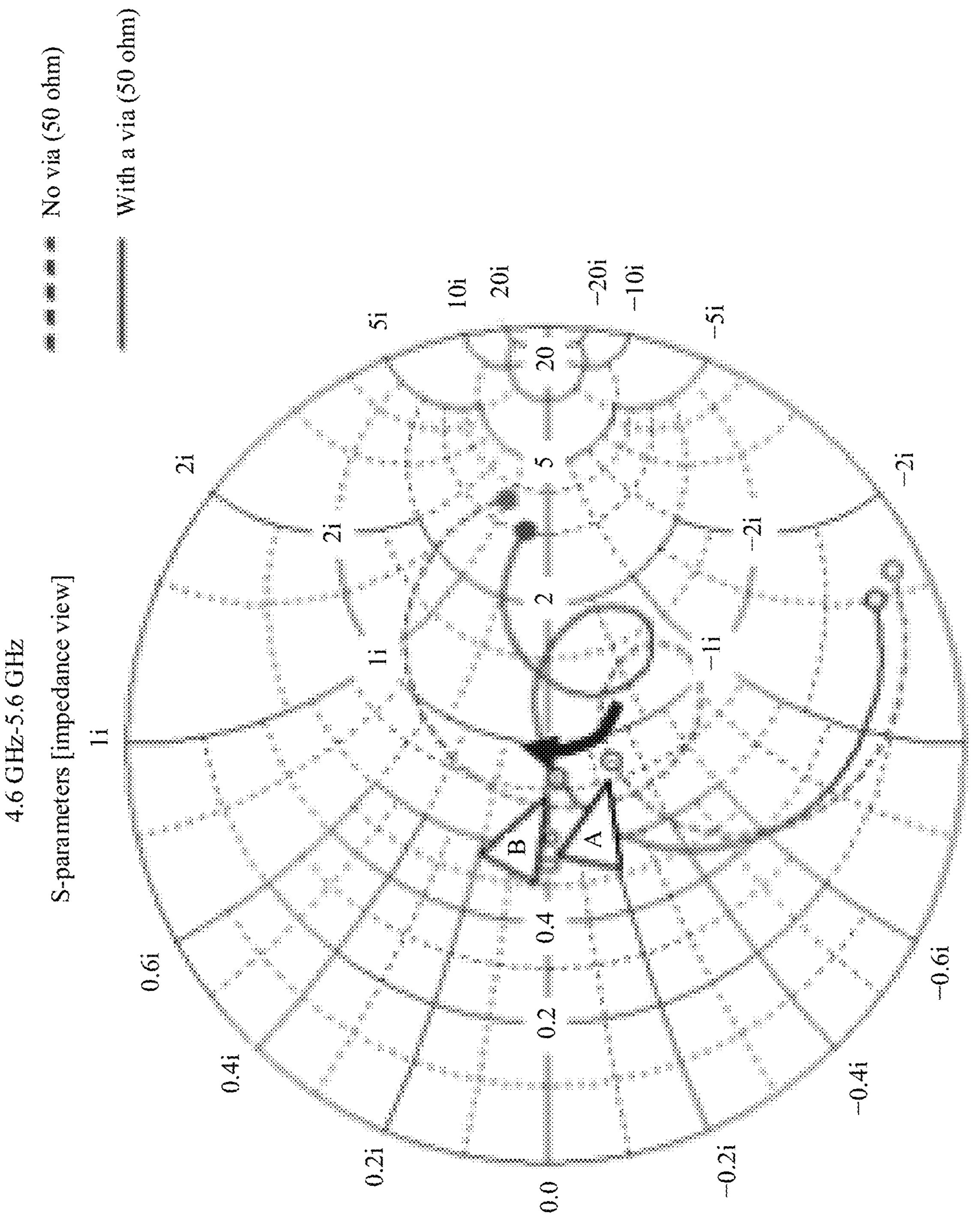
FIG. 9 is a Smith chart of a dual polarization antenna in which no via is introduced and a Smith chart of a dual polarization antenna in which a via is introduced according to an embodiment of this application.

Refer to FIG. 1 to FIG. 11. FIG. 1 is a schematic diagram of a plane structure of a dual polarization antenna used in the conventional technology. FIG. 2 is a plan view of a dual polarization antenna according to an embodiment of this application. FIG. 3 is a schematic diagram of an upper-layer structure of the dual polarization antenna according to an embodiment of this application. FIG. 4 is a schematic diagram of a lower-layer structure of the dual polarization antenna according to an embodiment of this application. FIG. 5 is a schematic diagram of a partially enlarged three-dimensional structure of the dual polarization antenna in which no via is introduced according to an embodiment of this application. FIG. 6 is a schematic diagram of a partially enlarged three-dimensional structure of a dual polarization antenna in which a via is introduced according to an embodiment of this application. FIG. 7 is a simulation diagram of a signal resonance of the dual polarization antenna according to an embodiment of this application. FIG. 8 is a simulation comparison diagram of a resonance generated when no via is introduced in a dual polarization antenna and a resonance generated when a via is introduced in a dual polarization antenna according to an embodiment of this application. FIG. 9 compares a Smith chart obtained when no via is introduced in a dual polarization antenna and a Smith chart obtained when a via is introduced in a dual polarization antenna according to an embodiment of this application. FIG. 10*a* to FIG. 10*d* are directivity patterns of a dual polarization antenna when the dual polarization antenna operates in four Wi-Fi frequency bands according to an embodiment of this application. FIG. 11*a* to FIG. 11*d* are distribution diagrams of currents of a dual polarization antenna when the dual polarization antenna operates in four Wi-Fi frequency bands according to an embodiment of this application.

The dual polarization antenna is an antenna capable of implementing a multiple-input multiple-output function. When the dual polarization antenna is disposed in a base station, only one antenna needs to be disposed in each sector of the base station to meet a requirement of a MIMO antenna.

As shown in FIG. 2 to FIG. 6, the dual polarization antenna provided in the first aspect of embodiments of this application includes one conductor 1 and two dipoles 2. The conductor 1 has four radiation arms 11, each radiation arm 11 forms one branch of the conductor 1, the two dipoles 2 are arranged in a cross manner to form four sectors 3, and one radiation arm 11 is disposed in each sector 3. When viewed from the top down, the dual polarization antenna is divided into the four sectors 3, which are formed by dividing the dual polarization antenna by each stub of the two dipoles 2. The radiation arm 11 in each sector 3 resonates with adjacent stubs of the two dipoles 2, to implement signal receiving and sending.

In the dual polarization antenna according to an embodiment, the conductor 1 and the dipole 2 are not in contact or connected, and the two dipoles 2 are not in contact or connected either. The conductor 1 and the two dipoles 2 have an overlapping part or a contacting part of vertical projections only in the top view, but have an obvious sense of hierarchy in the three-dimensional space. In an embodiment, a part of the conductor 1 is above the dipole 2, and a part of the conductor 1 is below the dipole 2. In an intersecting part of the vertical projections of the two dipoles 2, one dipole 2 is above the other dipole 2. Therefore, in an embodiment, connection bridges 12 connecting the radiation arms 11 in different planes are disposed between the radiation arms 11, two adjacent radiation arms 11 are connected by one connection bridge 12, and the connection bridge 12 is disposed above or below the dipole 2 between the two radiation arms 11 that are connected by the connection bridge 12.

For example, from a top perspective, the radiation arm 11 in each sector 3 extends from an intersection point of the vertical projections of the two dipoles 2 to an opening direction of the sector 3. The connection bridge 12 is connected between ends that are of the radiation arms 11 in two adjacent sectors 3 and that are close to the intersection point. A vertical projection of the connection bridge 12 intersects one stub of the dipole 2, but the connection bridge 12 is not in contact with or connected to the dipole 2 in the three-dimensional space. In this way, the conductor 1 having a suspension structure in the dual polarization antenna according to an embodiment is formed, so that the dual polarization antenna can generate four resonance points, to cover a plurality of frequency bands such as 1.8G, 2.4G, 5G LB, and 5G HB, and implement a dual polarization function in these frequency bands. In addition, the dual polarization antenna has two ports, and a degree of isolation of the two ports in a Wi-Fi frequency band reaches −20 dB, so that a requirement of a MIMO antenna is met, and a MIMO signal can be fed.

Because the conductor 1 is of a suspension structure, and the two dipoles 2 are obviously layered from top to bottom, to ensure a resonance effect between the radiation arm 11 and the dipole 2 without affecting signal receiving and sending, the radiation arm 11 in the dual polarization antenna in an embodiment is designed as a separated structure. For example, each radiation arm 11 has two half-arm elements 111, each half-arm element 111 has a proximal end close to the connection bridge 12 and a distal end far away from the connection bridge 12, the half-arm element 111 and the connection bridge 12 are connected at the proximal end, and the two half-arm elements 111 are connected to each other at the distal end.

The separated structure of the radiation arm 11 enables each half-arm element 111 of the radiation arm 11 to resonate with the stub of the dipole 2 on a same plane. In this way, a resonance between different half-arm elements 111 and the stub of the dipole 2 does not interfere with each other, to ensure that a degree of isolation between the two ports is not excessively small. In addition, a connection between the radiation arm 11 and two adjacent connection bridges 12 is more flexible and free, and is not limited to one plane, and no additional connecting piece needs to be designed. This is more conducive to implement a structure in which the conductor 1 suspends on the dipole 2.

Further, in the dual polarization antenna according to an embodiment, the conductor 1 has a cross-shaped projection viewed from the top perspective, and each radiation arm 11 is a branch of the conductor 1. Therefore, the half-arm element 111 of the radiation arm 11 is designed as a linear structure. In addition, to ensure resonance, a structure with a wider width is designed at an end of the half-arm element 111. For example, the half-arm element 111 has a straight arm 1111 and a bent arm 1112. The straight arm 1111 is connected to the connection bridge 12 at the proximal end, and the straight arm 1111 and the bent arm 1112 are connected at the distal end. Bent arms 1112 of the two half-arm elements 111 are connected to each other at the distal end and form a radiation ring. A maximum width of the radiation ring along a circumferential direction encircling a central axis that passes through an intersection point of the two dipoles 2 is greater than a maximum distance between the two straight arms 1111.

The dual polarization antenna in an embodiment uses the radiation arm 11 of the separated structure, and resonates with the dipole 2 by using a radiation ring that is formed at the distal end of the radiation arm 11 and that has a wider width in the circumferential direction of a plane, to enhance the resonance effect between the radiation arm 11 and the dipole 2.

Further, in the dual polarization antenna in an embodiment, to generate a better resonance between the radiation arm 11 and the dipole 2, the bent arms 1112 of the two half-arm elements 111 that form the radiation ring are preferably designed to be a structure that is located in a same plane as the stub of the dipole 2 that resonates with the bent arms 1112. For example, the two half-arm elements 111 of the same radiation arm 11 are located in different planes to form an upper-lower layered structure. The bent arms 1112 of the two half-arm elements 111 are connected through a connection via 13, so that one half-arm element 111 of the radiation arm 11 and the stub that is of the dipole 2 and located at an upper layer are in a same plane and resonate with each other, and the other half-arm element 111 of the radiation arm 11 and the stub that is of the dipole 2 and located at a lower layer are in a same plane and resonate with each other. Preferably, the connection via 13 is separately perpendicular to the planes in which the two half-arm elements 111 are located. The connection via 13 forms a distance between the two half-arm elements 111, so that two planes formed by the half-arm element 111 and the stub of the dipole 2 are parallel to each other, to ensure that the degree of isolation between the two ports is less than −20 dB.

In the dual polarization antenna in an embodiment, not only a suspension structure is formed between the conductor 1 and the dipole 2, but also the two half-arm elements 111 of the radiation arm 11 are designed as a suspension structure. Serial inductivity of the connection via 13 further enhances a resonance between the radiation arm 11 and the dipole 2, deepens a resonance depth, optimizes impedance matching, and improves antenna performance.

Further, in the dual polarization antenna according to an embodiment, a plane shape formed by the conductor 1 and the two dipoles 2 at the top perspective is designed as an asterisk. That is, the two dipoles 2 and the conductor 1 are cross-shaped suspension structures. For example, vertical projections of the two half-arm elements 111 of each radiation arm 11 are axisymmetric with respect to an angular bisector 31 of an angle formed by the two adjacent dipoles 2, and the four radiation arms 11 form a cross-shaped vertical projection. For example, a resonance distance between the half-arm element 111 that is of the radiation arm 11 and located at the upper layer and the stub that is of the dipole 2 and located at the upper layer and closest to the radiation arm 11 is equal to a resonance distance between the half-arm element 111 that is of the same radiation arm 11 and located at the lower layer and the stub that is of the dipole 2 and located at the lower layer and closest to the radiation arm 11, so that a resonance between the conductor 1 and the dipole 2 is more stable.

Further, to maintain close degrees of isolation between four resonances and prevent the resonances from interfering with each other, in the upper- and lower-layer suspension structure of the dual polarization antenna in an embodiment, two half-arm elements 111 connected by a connection bridge 12 are located in a same plane, two adjacent connection bridges 12 are located in different planes, and two connection bridges 12 that are symmetric with respect to the dipole 2 are located in a same plane. For example, there are two resonance planes in the upper- and lower-layer suspension structure. Two stubs of one dipole 2 are arranged on an upper resonance plane 4. Two half-arm elements 111 that are of two radiation arms 11 in two sectors 3 on one side of the dipole 2, connected to each other by the connection bridge 12, and far away from the dipole 2 are arranged on the upper resonance plane 4. Similarly, two half-arm elements 111 are arranged on the other side of the dipole 2 in the same manner. Similarly, two stubs of a dipole 2 are arranged on a lower resonance plane 5. Two half-arm elements 111 that are of two radiation arms 11 in two sectors 3 on one side of the dipole 2, connected to each other by the connection bridge 12, and far away from the dipole 2 are arranged on the lower resonance plane 5. Similarly, two half-arm elements 111 are arranged on the other side of the dipole 2 in the same manner.

In the dual polarization antenna of an embodiment, the conductor 1 and the dipoles 2 jointly form the resonance planes 4 and 5, and each resonance plane has the branches of the two dipoles 2, the two connection bridges 12 that are symmetric with respect to one of the dipoles 2, and the half-arm elements 111 that are of two adjacent radiation arms 11 and connected to the two connection bridges 12, to accurately form four resonance points and cover all Wi-Fi frequency bands.

Further, to ensure that the four resonances do not interfere with each other, in the dual polarization antenna in an embodiment, the radiation arm 11 further has a hollow portion 14. The hollow portion 14 is formed by the two half-arm elements 111 of the radiation arm 11 through enclosing, and the hollow portion 14 on each radiation arm 11 enables the conductor 1 to implement an unbalanced transformation function.

Further, in the dual polarization antenna in an embodiment, a feeding space 15 is enclosed by the four connection bridges 12, and the four hollow portions 14 are connected to each other through the feeding space 15, so that a projection of the conductor 1 is in a shape of a cross slot.

Further, in the dual polarization antenna according to an embodiment, to match the suspension structure of the conductor 1, a structure of the dipole 2 is also designed to be a three-dimensional suspension structure. In this way, the two dipoles 2 and the conductor 1 form a multi-plane resonance structure with upper- and lower-layer cabling. For example, each dipole 2 includes two dipole elements 21 and a coupling arm 22 located between the two dipole elements 21. The coupling arm 22 is mechanically connected to one of the dipole elements 21 through a via 23, and electrically coupled to the other dipole element 21 through a feed point 24. The feed point 24 and the via 23 are located on two opposite sides of a central axis that passes through an intersection point of the two dipoles 2.

In the dual polarization antenna in an embodiment, the dipole 2 includes three parts: two dipole elements 21 for resonance and one coupling arm 22 for feeding and forming a suspension structure. One end of the coupling arm 22 is connected to one of the dipole elements 21 through the via 23. The other end of the coupling arm 22 is not in contact with or connected to the other dipole element 21, and a current is fed from one dipole element 21 to the other dipole element 21 through the feed point 24 at this end. In the dual polarization antenna according to an embodiment, the dipole 2 is designed as a three-segment three-dimensional suspension structure, and the via 23 is added on the dipole element 21, so that a resonance of the dipoles 2 is in serial inductivity, to optimize impedance matching, deepen a resonance depth, and improve performance of the dual polarization antenna.

Figure 10A:
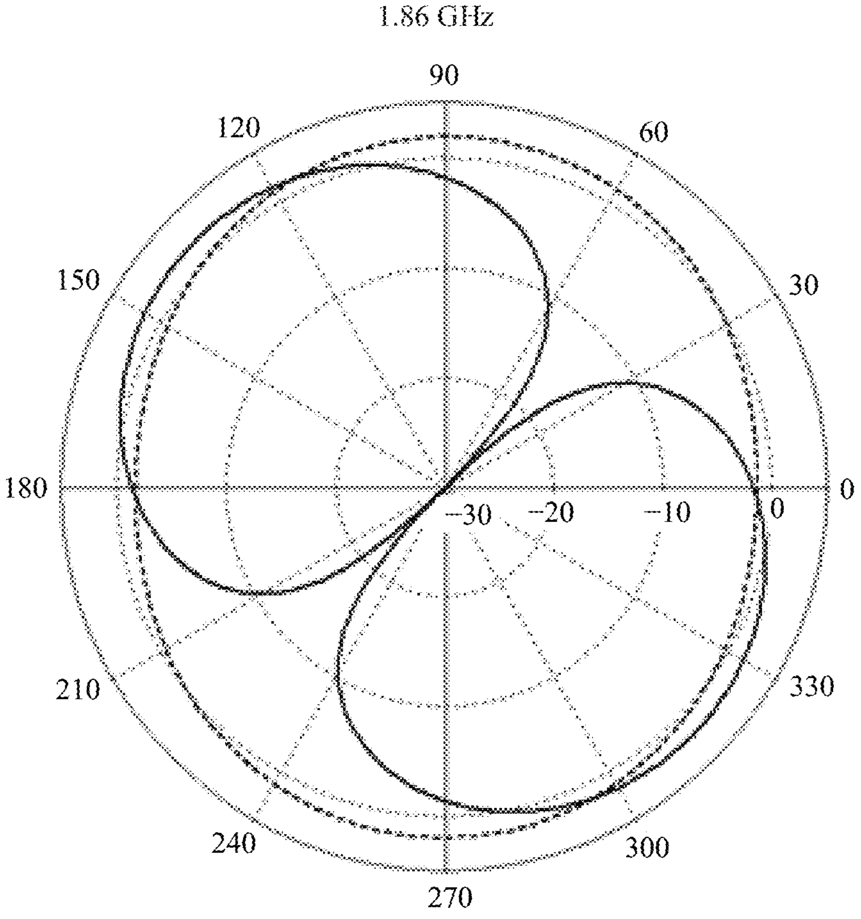
FIG. 10*a* to FIG. 10*d* are directivity patterns of a dual polarization antenna when the dual polarization antenna operates in four Wi-Fi frequency bands according to an embodiment of this application.
Figure 10B:
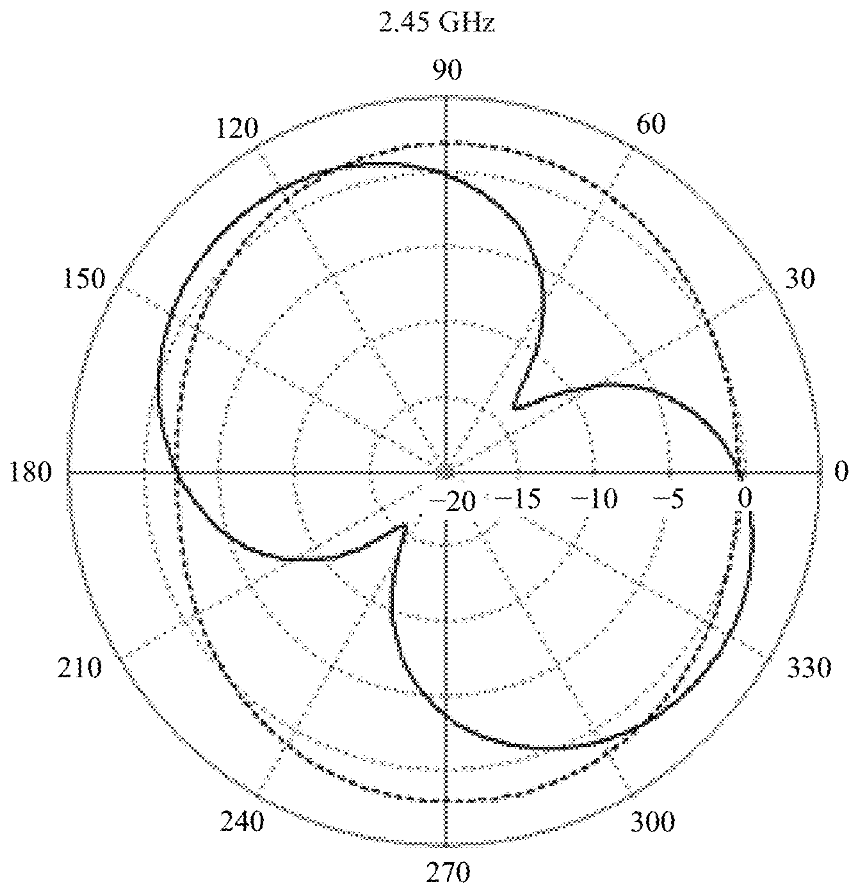
Figure 10C:
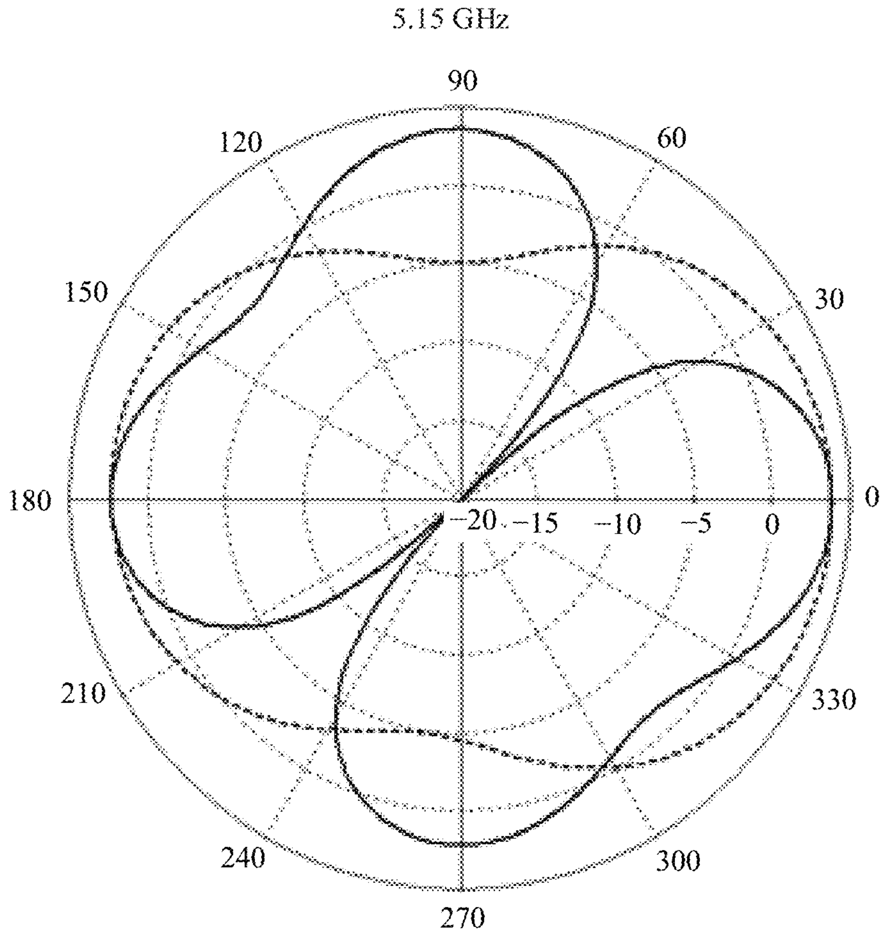
Figure 10D:
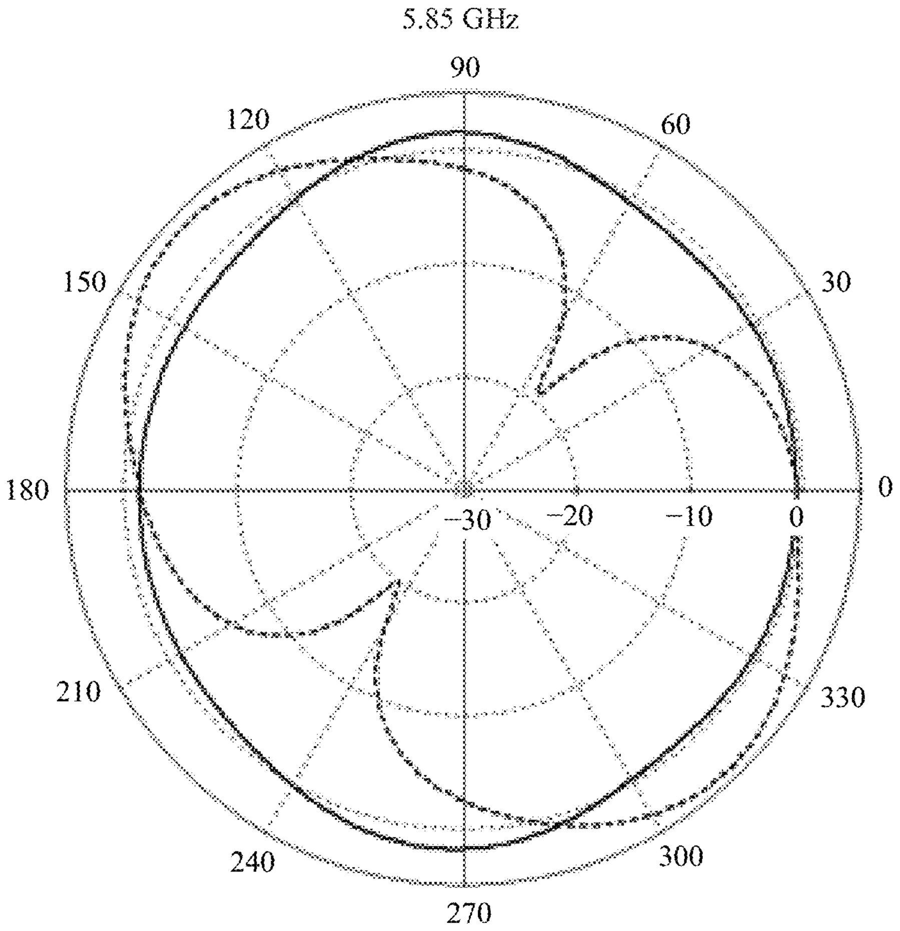
Figure 11A:
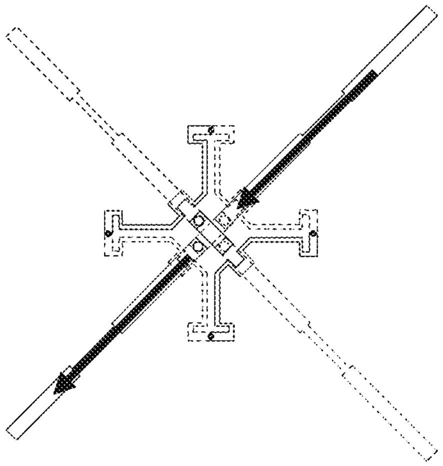
FIG. 11*a* to FIG. 11*d* are distribution diagrams of currents of a dual polarization antenna when the dual polarization antenna operates in four Wi-Fi frequency bands according to an embodiment of this application.
Figure 11B:
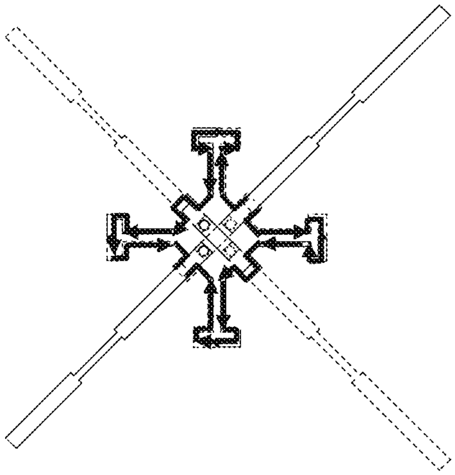
Figure 11C:
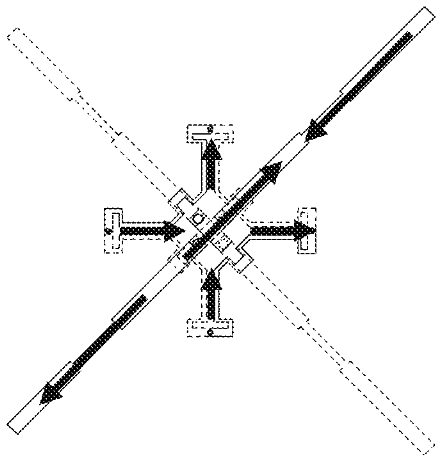
Figure 11D:
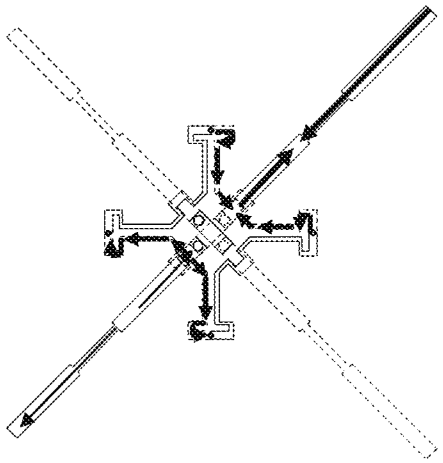

In the dual polarization antenna in an embodiment, a feeding space 15 is enclosed by the four connection bridges 12, the via 23 and the feed point 24 are located in the feeding space 15, and currents of the two stubs of the dipole 2 are blocked in the feeding space 15. As shown in FIG. 10*d* and FIG. 11*d*, when the dipole 2 and the conductor 1 resonate in a high frequency band, if a current of an upper half stub of the dipole 2 is coupled to the coupling arm 22 through the feed point 24 of the feeding space 15, and then flows to a lower half stub of the dipole 2 through the via 23, a magnitude of the current is obviously reduced, and a straight line representing the magnitude of the current shown in the figure becomes thinner. In this way, a state in which a current of one stub of the dipole 2 is obviously stronger than that of the other stub of the dipole 2 is formed. Because the via 23 is in serial inductivity, the via 23 blocks a surface current in the high frequency band. As a result, in the high frequency band, only one stub of the dipole 2 has a stronger current, so that a directivity pattern is controlled.

In the dual polarization antenna in an embodiment, the feed point 24 is disposed at one end that is of the dipole element 21 and located in the feeding space 15, or disposed at one end that is of the coupling arm 22 and far away from the via 23. In this way, in the feeding space 15, the current of the dipole 2 undergoes upper- and lower-layer electric coupling, to deepen the resonance depth.

Further, in the dual polarization antenna in an embodiment, the coupling arm 22 and the dipole elements 21 of each dipole 2 are located in different planes, and the coupling arms 22 of the two dipoles 2 are separately located in different planes, to form a suspension structure in which the two dipole elements 21 are in one plane and the coupling arm 22 is in another plane. In this case, because of existence of the via 23, in the feeding space 15, the current flowing through the dipole 2 undergoes upper- and lower-layer coupling twice, to further deepen the resonance depth.

In the dual polarization antenna in an embodiment, polarization planes of two dipoles 2 extend orthogonally to each other. Polarization orthogonality of the two dipoles 2 can ensure that the degree of isolation between the two ports meets a requirement of intermodulation on a degree of isolation between antennas, and the degree of isolation is less than −20 dB while all Wi-Fi frequency bands are covered.

In the dual polarization antenna in an embodiment, an included angle between the radiation arm 11 and each of the two adjacent dipoles 2 is 45°. In this way, resonance distances between the radiation arms 11 of the conductor 1 and the dipole elements 21 of the dipole 2 are the same.

In the dual polarization antenna in an embodiment, projections of the four radiation arms 11 in a vertical space parallel to the central axis that passes through the intersection point of the two dipoles 2 form a centrosymmetric cross shape with respect to the central axis, so that the conductor 1 forms a suspension cross structure with respect to the dipole 2.

In the dual polarization antenna in an embodiment, an included angle between the connection bridge 12 and each of the two adjacent radiation arms 11 is 135°, and the feeding space 15 is a square.

FIG. 7 is a simulation diagram of a resonance of the dual polarization antenna according to an embodiment. Based on the two dipoles 2 that are orthogonal to each other and the conductor 1 having the suspension cross structure, signal simulation is performed on the dual polarization antenna formed by combining the conductor 1 having the suspension cross structure and the dipole 2 through proper upper- and lower-layer cabling, to form four resonances, so as to obtain the simulation diagram that can cover a frequency band 1.8 GHz and three Wi-Fi frequency bands: 2.4 GHz, 5.1 GHz, and 5.8 GHz. The four resonances respectively correspond to four operating modes of the dual polarization antenna, and are applicable to Wi-Fi tri-band dual polarization coverage in a router product. 2.4 GHz is an operating frequency band of a low Wi-Fi frequency, and 5G LB and 5G HB are operating frequency bands of high Wi-Fi frequencies.

FIG. 8 is a comparison diagram of resonance depths of the dual polarization antenna according to an embodiment when the via 13 and the via 23 are disposed and when the via 13 and the via 23 are not disposed. It can be seen that when the via 13 and the via 23 are disposed in the dipole 2, the dipole 2 presents an upper-lower layered suspension structure, the resonance depth of the dipole 2 is deeper.

It can be learned from the simulation diagrams shown in FIG. 7 and FIG. 8 that a return loss of the antenna generated by the resonances covers the four frequency bands: 1.8 GHz, 2.4 GHz, 5.1 GHz, and 5.8 GHz, the degree of isolation between the two ports is less than −20 dB, and the via 13 and the via 23 are added at a feeding position of the dipole 2 to deepen the resonance depth, optimize the impedance matching, implement good radiation performance, and improve the antenna performance.

FIG. 9 is a Smith chart of the dual polarization antenna according to an embodiment when the via 13 and the via 23 are disposed and when the via 13 and the via 23 are not disposed. By comparing dashed lines (when the via 13 and the via 23 are not disposed) and solid lines (when the via 13 and the via 23 are disposed), it can be learned that, when the via 13 and the via 23 are not disposed, a mark point A is in the fourth quadrant, and after the via 13 and the via 23 are added, the mark point moves clockwise from A to B (located at a central matching point). Therefore, the dual polarization antenna provided with the via 13 and the via 23 further optimizes impedance through the serial inductivity of the via 13 and the via 23.

FIG. 10*a* to FIG. 10*d* are directivity diagrams of the dual polarization antenna according to an embodiment when the dual polarization antenna operates in the four frequency bands: 1.8 GHz, 2.4 GHz, 5.1 GHz, and 5.8 GHz. FIG. 11*a* to FIG. 11*d* are distribution diagrams of currents of the dual polarization antenna according to an embodiment of the application when the dual polarization antenna operates in the four frequency bands.

It can be learned from these directivity patterns and distribution diagrams of the surface currents that the dual polarization antenna according to an embodiment has four operating modes: a mode 1, a mode 2, a mode 3, and a mode 4. The mode 1 is a dipole fundamental mode, the mode 2 is a “dipole-like” fundamental mode generated by the suspension cross structure of the conductor 1, and mode 3 is jointly generated by a dipole higher-order mode and the suspension cross structure of the conductor 1. Because of existence of a surface current on the conductor 1, in a directivity pattern of the dipole higher-order mode, a main lobe disappears and a side lobe is enhanced. The mode 4 is also jointly generated by the dipole higher-order mode and a slot mode of the suspension cross structure of the conductor 1, and because of existence of the metal via 13 and via 23, a current of the stub that is of the dipole 2 and located at the upper layer is obviously stronger than a current of the stub that is of the dipole 2 and located at the lower layer.

According to a second aspect, an embodiment provides a router, including the dual polarization antenna provided in the first aspect. The dual polarization antenna has a small size, a thin thickness, and good coverage of a Wi-Fi frequency band, and is applicable to a router product.

According to a third aspect, an embodiment provides a base station, including the dual polarization antenna provided in the first aspect. A properly designed feeding structure can cover a wide frequency band of the base station.

Compared with a disadvantage that a dual polarization antenna with only orthogonal dipoles 2 generates only two resonance points, the dual polarization antenna in an embodiment can accurately form four resonances by combining a pair of orthogonal dipoles 2 and a suspension cross-shaped conductor 1, properly upper- and lower-layer arrangement is used, and the vias 13 and 23 are disposed in the feeding space 15 and on the conductor 1, to accurately form the four resonances and implement a four-frequency resonance, so as to cover four Wi-Fi frequency bands. In addition, the degree of isolation between the two ports is less than −20 dB, and is smaller. In the six vias 13 and 23 disposed on the dipoles 2 and the conductor 1, two vias 23 are located in the feeding space 15, and are configured to connect the dipole element 21 and the coupling arm 22 of the dipole 2, and each of the remaining four vias 13 is located at a joint of the bent arm 1112 of the two half-arm elements 111 of the radiation arm 11, and is configured to form the radiation ring of an upper-lower layered structure, so as to make full use of the serial inductivity of the vias 13 and 23, deepen the resonance depth, optimize the impedance matching, implement stronger antenna performance. In this way, the antenna is applicable to a router or the base station, and a signal receiving and sending effect is better. In addition, in a high-frequency operating mode, a high-frequency surface current is obstructed. As a result, in the high-frequency mode, only one stub of the dipole 2 has a stronger current, so that a directivity pattern is controlled.

The foregoing descriptions are merely implementations of the present disclosure, but the protection scope of the present disclosure is not limited thereto. Any variation or replacement readily figured out by one of ordinary skilled in the art within the technical scope disclosed in the present disclosure shall fall within the protection scope of the present disclosure. Therefore, the protection scope of the present disclosure shall be subject to the protection scope of the claims.

What is claimed is:

1. A dual polarization antenna, comprising:

a conductor having four radiation arms, wherein each radiation arm forms a branch of the conductor, and wherein two adjacent radiation arms are connected by using a connection bridge; and two dipoles arranged in a cross manner to form four sectors, wherein one radiation arm is arranged in each sector, and wherein the connection bridge is disposed above or below the dipole between the two radiation arms connected by the connection bridge.

2. The dual polarization antenna according to claim 1, wherein each radiation arm has two half-arm elements, wherein each of the half-arm elements has a proximal end near the connection bridge and a distal end away from the connection bridge, wherein the half-arm element and the connection bridge are connected at the proximal end, and wherein the two half-arm elements are connected to each other at the distal end.

3. The dual polarization antenna according to claim 2, wherein the half-arm element has a straight arm and a bent arm, wherein the straight arm and the connection bridge are connected at the proximal end, wherein the straight arm and the bent arm are connected at the distal end, wherein bent arms of the two half-arm elements are connected to each other at the distal end and form a radiation ring, and wherein a maximum width of the radiation ring along a circumferential direction encircling a central axis that passes through an intersection point of the two dipoles is greater than a maximum distance between the two straight arms.

4. The dual polarization antenna according to claim 3, wherein the two half-arm elements of each radiation arm are located in different planes and connected through a connection via.

5. The dual polarization antenna according to claim 4, wherein the connection via is separately perpendicular to the planes in which the two half-arm elements are located.

6. The dual polarization antenna according to claim 2, wherein vertical projections of the two half-arm elements of each radiation arm are axisymmetric to an angular bisector of an angle formed by the two dipoles, and wherein the four radiation arms form a cross-shaped vertical projection.

7. The dual polarization antenna according to claim 3, wherein the two half-arm elements connected by the connection bridge are located in a same plane, wherein two adjacent connection bridges are located in different planes, and wherein two connection bridges symmetric to the dipole are located in a same plane.

8. The dual polarization antenna according to claim 3, wherein each radiation arm further has a hollow portion formed by the two half-arm elements of the radiation arm through enclosing.

9. The dual polarization antenna according to claim 8, wherein a feeding space is enclosed by four connection bridges, and wherein the four hollow portions are connected to each other through the feeding space.

10. The dual polarization antenna according to claim 1, wherein each of the dipoles comprises two dipole elements and a coupling arm located between the two dipole elements, wherein the coupling arm is mechanically connected to one of the dipole elements through a via, and electrically coupled to the other dipole element through a feed point, and wherein the feed point and the via are located on two opposite sides of a central axis that passes through an intersection point of the two dipoles.

11. The dual polarization antenna according to claim 10, wherein a feeding space is enclosed by four connection bridges, and wherein the via and the feed point are located in the feeding space.

12. The dual polarization antenna according to claim 10, wherein the feed point is disposed at an end of the dipole element and located in the feeding space, or disposed at an end of the coupling arm and far away from the via.

13. The dual polarization antenna according to claim 10, wherein the coupling arm and the dipole element of each dipole are located in different planes, and wherein the coupling arms of the two dipoles are separately located in different planes.

14. The dual polarization antenna according to claim 1, wherein polarization planes of the two dipoles extend orthogonally to each other.

15. The dual polarization antenna according to claim 1, wherein an included angle between each radiation arm and each of the two dipoles is 45°.

16. The dual polarization antenna according to claim 1, wherein projections of the four radiation arms in a vertical space parallel to a central axis that passes through an intersection point of the two dipoles form a centrosymmetric cross shape to the central axis.

17. The dual polarization antenna according to claim 1, wherein an included angle between the connection bridge and each of the two adjacent radiation arms is 135°.

18. A router, comprising a dual polarization antenna comprising:

a conductor having four radiation arms, wherein each radiation arm forms a branch of the conductor, and wherein two adjacent radiation arms are connected by using a connection bridge; and two dipoles arranged in a cross manner to form four sectors, wherein one radiation arm is arranged in each sector, and wherein the connection bridge is disposed above or below the dipole between the two radiation arms connected by the connection bridge.

19. The router according to claim 18, wherein each radiation arm has two half-arm elements, wherein each of the half-arm elements has a proximal end near the connection bridge and a distal end away from the connection bridge, wherein the half-arm element and the connection bridge are connected at the proximal end, and wherein the two half-arm elements are connected to each other at the distal end.

20. A base station, comprising a dual polarization antenna comprising:

a conductor having four radiation arms, wherein each radiation arm forms a branch of the conductor, and wherein two adjacent radiation arms are connected by using a connection bridge; and two dipoles arranged in a cross manner to form four sectors, wherein one radiation arm is arranged in each sector, and wherein the connection bridge is disposed above or below the dipole between the two radiation arms connected by the connection bridge.

* * * * *